(12) United States Patent
Baek

(10) Patent No.: US 8,909,028 B2
(45) Date of Patent: Dec. 9, 2014

(54) METHOD FOR PROVIDING DIGITAL CONTENT

(75) Inventor: Wonjang Baek, Seongnam-si (KR)

(73) Assignee: SK Planet Co., Ltd., Seoul (KR)

( * ) Notice: Subject to any disclaimer, the term of this patent is extended or adjusted under 35 U.S.C. 154(b) by 1191 days.

(21) Appl. No.: 12/458,877

(22) Filed: Jul. 27, 2009

(65) Prior Publication Data

US 2010/0021134 A1    Jan. 28, 2010

(30) Foreign Application Priority Data

Jul. 28, 2008    (KR) .................. 10-2008-0073483

(51) Int. Cl.
| | |
|---|---|
| *H04N 9/80* | (2006.01) |
| *H04N 21/432* | (2011.01) |
| *H04N 21/658* | (2011.01) |
| *H04N 7/173* | (2011.01) |
| *H04N 9/87* | (2006.01) |
| *H04N 21/426* | (2011.01) |
| *H04N 5/85* | (2006.01) |
| *H04N 21/81* | (2011.01) |
| *H04N 21/262* | (2011.01) |
| *H04N 21/44* | (2011.01) |

(52) U.S. Cl.
CPC ............ *H04N 5/85* (2013.01); *H04N 21/4325* (2013.01); *H04N 21/6581* (2013.01); *H04N 7/17318* (2013.01); *H04N 9/8715* (2013.01); *H04N 21/42646* (2013.01); *H04N 21/812* (2013.01); *H04N 21/26258* (2013.01); *H04N 21/44016* (2013.01)

USPC .......................... 386/248; 386/239; 725/87

(58) Field of Classification Search
USPC .......................... 725/87; 386/248, 336, 239
See application file for complete search history.

(56) References Cited

U.S. PATENT DOCUMENTS

| | | | |
|---|---|---|---|
| 7,831,131 B2 * | 11/2010 | Seo et al. ................. 386/248 |
| 2003/0093790 A1 * | 5/2003 | Logan et al. .............. 725/38 |
| 2006/0039255 A1 * | 2/2006 | Seo et al. ................. 369/47.1 |
| 2006/0184542 A1 | 8/2006 | Kim et al. |
| 2007/0101373 A1 * | 5/2007 | Bodlaender et al. ......... 725/86 |
| 2007/0217305 A1 * | 9/2007 | Seo et al. ................. 369/47.1 |
| 2007/0253679 A1 | 11/2007 | Tanaka et al. |
| 2008/0025182 A1 | 1/2008 | Seo et al. |
| 2009/0208189 A1 * | 8/2009 | Sasaki et al. .............. 386/125 |
| 2009/0271411 A1 * | 10/2009 | Takashima et al. ......... 707/10 |

FOREIGN PATENT DOCUMENTS

| | | |
|---|---|---|
| KR | 10-2006-0081323 A | 7/2006 |
| KR | 10-2007-0007940 A | 1/2007 |

OTHER PUBLICATIONS

First Office Action dated Jan. 27, 2010, issued by Korean Patent Office in corresponding application KR 10-2008-0073483.
International Search Report dated Mar. 15, 2010, issued by WIPO in corresponding application PCT/KR2009/003862.

* cited by examiner

*Primary Examiner* — David Harvey
(74) *Attorney, Agent, or Firm* — Stein IP, LLC

(57) ABSTRACT

A method for providing a digital content is disclosed. In accordance with the present invention, a playback information package generated according to a playback sequence of a main digital content and an auxiliary digital content is used to facilitate a configuration of a playback apparatus supporting a BD-J specification.

14 Claims, 5 Drawing Sheets

*Fig. 1* <Prior Art>

<Prior Art>

| a1c1 | ... | a1c10 | m2c1 | ... | m2c50 |
| a2c1 | ... | a2c10 | m2c51 | ... | m2c100 |
| a3c1 | ... | a3c10 | | | |

METHOD FOR PROVIDING DIGITAL CONTENT

This application claims the benefit of Korean Patent Application No. 10-2008-0073483 filed on Jul. 28, 2008, which is hereby incorporated for reference.

BACKGROUND OF THE INVENTION

1. Field of the Invention

The present invention relates to a method for providing a digital content, and more particularly to a method for providing a digital content wherein a playback information package generated according to a playback sequence of a main digital content and an auxiliary digital content is used to facilitate a configuration of a playback apparatus supporting a BD-J specification.

2. Description of the Related Art

A Blu-ray specification is designed by Blu-ray Disc Association ("BDA"), whose members include Sony, Hitachi and Sharp. The Blu-ray specification includes a specification of a Blu-ray disk which is an optical disc that may be read and recorded using a blue laser.

While a diameter and a thickness of the Blu-ray disk, which are 12 cm and 1.2 mm, respectively, are same as those of conventional CD (Compact Disc) and DVD (Digital Versatile Disc), a storage capacity thereof is larger than those of the conventional CD and DVD.

Because the blue laser having a wavelength of 405 nm is used for reading the Blu-ray disk instead of a red laser having a wavelength of 650 nm used for reading the DVD, more data can be stored in the Blu-ray disk than the DVD.

Specifically, a single layer Blu-ray disk is capable of storing up to 25 GB of a data and a dual layer Blu-ray disk is capable of storing up to 50 GB of the data. This means that the Blu-ray disk can store five times more data than the DVD.

Moreover, a quad layer Blu-ray disk and an octal layer Blu-ray disk can store up to 100 GB and 200 GB, respectively.

The Blu-ray disk supports a video compression codec of MPEG-2 which is widely used in the DVD. Moreover, BDA standard specification requires the Blu-ray disk to use H.264/AVC or VC-1 as the video compression codec which provides improved compression ratio compared to MPEG-2.

In addition, the Blu-ray disk supports audio formats such as Dolby Digital Plus, Dolby TrueHD and DTS-HD Master Audio as well as PCM (Pulse-code modulation), Dolby Digital and DTS.

A Blu-ray player supporting a BD-J specification supports an interactive service based on JAVA. Moreover, the Blu-ray player supporting the BD-J specification supports a network connectivity, a PIP (Picture-In-Picture) and a connection to a local storage.

A Blu-ray player supporting a BD-Live specification is capable of playing a digital content received through a network communication in addition to capabilities of the Blu-ray player supporting a BD-J specification.

A Virtual File System ("VFS") enables a playback of a data which is not stored on the Blu-ray disk. Specifically, the VFS configures a virtual package on the Blu-ray player to enable the Blu-ray player to play the data stored in other than the Blu-ray disk. For instance, the digital content received through a USB or the network communication may be played as if the digital content is stored in the Blu-ray disk.

Hereinafter, "a playback apparatus supporting the BD-J specification" includes the Blu-ray player supporting the BD-J specification or an apparatus using a middleware supporting the BD-J specification such as a TV, a set-top box, a PMP (Portable Multimedia Player), a video game console, a PC (Personal Computer) and a PVR (Personal Video Recorder).

The apparatus using the middleware supporting the BD-J specification is not required to have a Blu-ray disk reading capability.

FIG. 1 is a diagram illustrating a configuration for receiving a digital content via a network in a conventional playback apparatus supporting a BD-J specification.

A digital content providing server generates a BUMF (Binding Unit Manifest File) information, an SF (Signature File) information, a playlist information, movie clips and a clip information associated with each of the movie clips according to the BD-J specification.

The BUMF information defines a configuration of a virtual package in XML (Extensible Markup Language) format. For instance, the BUMF information includes a file name information and a binding information on the movie clips included in the digital content received from the digital content providing server.

The SF information is used for verifying a validity of the BUMF information. The SF information uses SHA (Secure Hash algorithm)-1.

The playlist information includes an information on the digital content to be played. For instance, the playlist information includes a playback sequence information, a PlayItem information and a PlayListMark information on the movie clips included in the digital content.

The clip information includes an information required for playing the movie clips. For instance, the clip information includes a stream format information of the corresponding clip, a number of packets included in the corresponding clip, an encoding specification of the corresponding clip and a time stamp information.

The playback apparatus stores the BUMF information, the SF information, the playlist information and the clip information received from the digital content providing server in a BUDA (Binding Unit Data Area). The playback apparatus carries out a package update from a disk package to the virtual package based on the BUMF information, the SF information, the playlist information and the clip information stored in the BUDA. That is, the playback apparatus is configured to play the digital content received from the digital content providing server instead of playing a data stored in the Blu-ray disk.

When the playback apparatus is fully configured, the playback apparatus receives and plays the digital content from the digital content providing server.

In order to play the digital content received from the digital content providing server, the playback apparatus must identify a size of the digital content, the number of clips included in the digital content, a encoding algorithm of the clip and a validity verification information by receiving the BUMF information, the SF information, the playlist information and the clip information from the digital content providing server.

In addition, the playback apparatus may provide an auxiliary digital content from an auxiliary digital content providing server.

That is, when a user selects a main digital content, the digital content providing server transmits the selected main digital content along with the auxiliary digital content to the playback apparatus.

For instance, when the user selects one of movies via a VOD (video on demand), the digital content providing server transmits the auxiliary digital content such as a pre-roll advertisement provided prior to the playback of the selected movie and post-roll advertisement provided after the playback of the selected movie to the user as well as the main digital content, i.e. the selected movie. Preferably, in order to provide a user-specific auxiliary digital content, a separate server for providing the auxiliary digital content, i.e. the auxiliary digital content providing server is employed to enable a transmission of the auxiliary digital content to the playback apparatus.

Therefore, the playback apparatus must carry out a package update for the auxiliary digital content as well as the main digital content in order to play both the main digital content and the auxiliary digital content received from the digital content providing server.

That is, the playback apparatus stores the BUMF information, the SF information, the playlist information and the clip information on each of the main digital content and the auxiliary digital content received from the digital content providing server in a BUDA (Binding Unit Data Area). The playback apparatus carries out a package update from a disk package to the virtual package based on the BUMF informations, the SF informations, the playlist informations and the clip informations stored in the BUDA. When the playback apparatus is fully configured, the playback apparatus sequentially receives and plays the main digital content and the auxiliary digital content including the movie clips.

FIG. 2 is a diagram illustrating an example for configuring a virtual package according to a main digital content and an auxiliary digital content in a conventional playback apparatus supporting a BD-J specification.

The digital content providing server stores a the main information on the main digital content. For instance, when the digital content providing server stores a plurality of movie data, the digital content providing server also stores the main information such as the BUMF information, the SF information, the playlist information and the clip information of each movie data in the XML format. Mov__1.xml through mov_m.xml shown in FIG. 2 represent the main information on the main digital content.

In addition, the digital content providing server or the auxiliary digital content providing server stores the auxiliary information on the auxiliary digital content. For instance, when the auxiliary digital content providing server stores a plurality of advertisement data, the auxiliary digital content providing server also stores the auxiliary information such as the BUMF information, the SF information, the playlist information and the clip information of each advertisement data in the XML format. Ad__1.xml through ad_n.xml shown in FIG. 2 represent the auxiliary information on the auxiliary digital content.

For instance, when the user selects one of the movies corresponding to mov__2.xml, the digital content providing server provides the advertisement data corresponding to ad__1.xml provided prior to the playback of mov__2.xml, and the advertisement data corresponding to ad__2.xml provided after the playback of mov__2.xml.

Accordingly, the playback apparatus configures the virtual package based on ad__1.xml which is the pre-roll advertisement, and the playback apparatus then receives, from the digital content providing server or the auxiliary digital content providing server, and plays the pre-roll advertisement.

Thereafter, the playback apparatus configures the virtual package based on mov__2.xml which is the selected movie, and the playback apparatus then receives, from the digital content providing server, and plays the selected movie.

Thereafter, the playback apparatus configures the virtual package based on ad__2.xml which is the post-roll advertisement, and the playback apparatus then receives, from the digital content providing server or the auxiliary digital content providing server, and plays the post-roll advertisement.

Therefore, a conventional playback apparatus shown in FIG. 2 configures the virtual package three times in order to play the main digital content and the auxiliary digital content received from the digital content providing server and the auxiliary digital content providing server.

That is, a long time is required to provide the main digital content selected by the user since the conventional playback apparatus is required to configure the virtual package for each of the main digital content and the auxiliary digital content.

SUMMARY OF THE INVENTION

It is an object of the present invention to provide a method for providing a digital content wherein a playback information package generated according to a playback sequence of a main digital content and an auxiliary digital content is used to facilitate a configuration of a playback apparatus supporting a BD-J specification.

In order to achieve above-described object of the present invention, there is provided a method for providing a digital content, the method comprising steps of: (a) receiving a request for a main digital content from a playback apparatus supporting a BD-J specification; (b) extracting a main information on the main digital content provided to the playback apparatus according to the request and an the auxiliary information on an auxiliary digital content provided to the playback apparatus along with the main digital content; (c) combining the main information with the auxiliary information to generate a playback information package; and (d) transmitting the playback information package to the playback apparatus.

Preferably, the request includes at least one of a content ID information for identifying the main digital content, a device ID information for identifying the playback apparatus and a user ID information for identifying a user using the playback apparatus.

Preferably, the step (b) comprises: (b-1) extracting the main information on the main digital content; (b-2) transmitting at least one of the content ID information, the device ID information and the user ID information to an auxiliary digital content providing server; and (b-3) receiving the auxiliary information from the auxiliary digital content providing server.

Preferably, the step (c) comprises combining the main information and the auxiliary information according to a playback sequence of the main digital content with the auxiliary digital content to generate the playback information package.

Preferably, the playback information package comprises a BUMF information, an SF information and a playlist information and a clip information generated by combining the main information and the auxiliary information according to the playback sequence of the main digital content and the auxiliary digital content.

The method in accordance with the present invention may further comprise transmitting the main digital content clip-by-clip to the playback apparatus.

The method in accordance with the present invention may further comprise receiving the auxiliary digital content from an auxiliary digital content providing server; and transmitting the auxiliary digital content clip-by-clip to the playback apparatus.

There is also provided a method for providing a digital content, the method being carried out in a playback apparatus supporting a BD-J specification and comprising steps of: (a) transmitting a request for a main digital content to a digital content providing server; (b) receiving a playback information package from the digital content providing server dynamically generated by the digital content providing server, the playback information package being generated by combining a the main information on the main digital content provided in response to the request with an auxiliary information on an auxiliary digital content; (c) configuring the playback apparatus for a playback of the main digital content and the auxiliary digital content based on the playback information package; and (d) receiving and playing the main digital content and the auxiliary digital content.

The method in accordance with the present invention may further comprise receiving a user input for selecting the main digital content prior to carrying out in the step (a), wherein the step (a) comprises transmitting the request to the digital content providing server, wherein the request includes at least one of a content ID information for identifying the main digital content, a device ID information for identifying the playback apparatus and a user ID information for identifying a user using the playback apparatus.

Preferably, the step (b) comprises receiving the playback information package generated according to a playback sequence of the main digital content and the auxiliary digital content.

Preferably, the playback information package comprises a BUMF information, an SF information and a playlist information and a clip information according to a playback sequence of the main digital content and the auxiliary digital content.

Preferably, the step (c) comprises configuring a virtual package for the playback of the main digital content and the auxiliary digital content based on the playback information package.

Preferably, the step (d) comprises receiving and playing each of the main digital content and the auxiliary digital content clip-by-clip from the digital content providing server.

Preferably, the playback information package further comprises an ID information for identifying an auxiliary digital content providing server, and wherein the step (d) comprises receiving and playing the auxiliary digital content clip-by-clip from the auxiliary digital content providing server.

DETAILED DESCRIPTION OF THE INVENTION

A method for providing a digital content in accordance with the present invention will be described in detail with reference to accompanied drawings.

Figure 1:
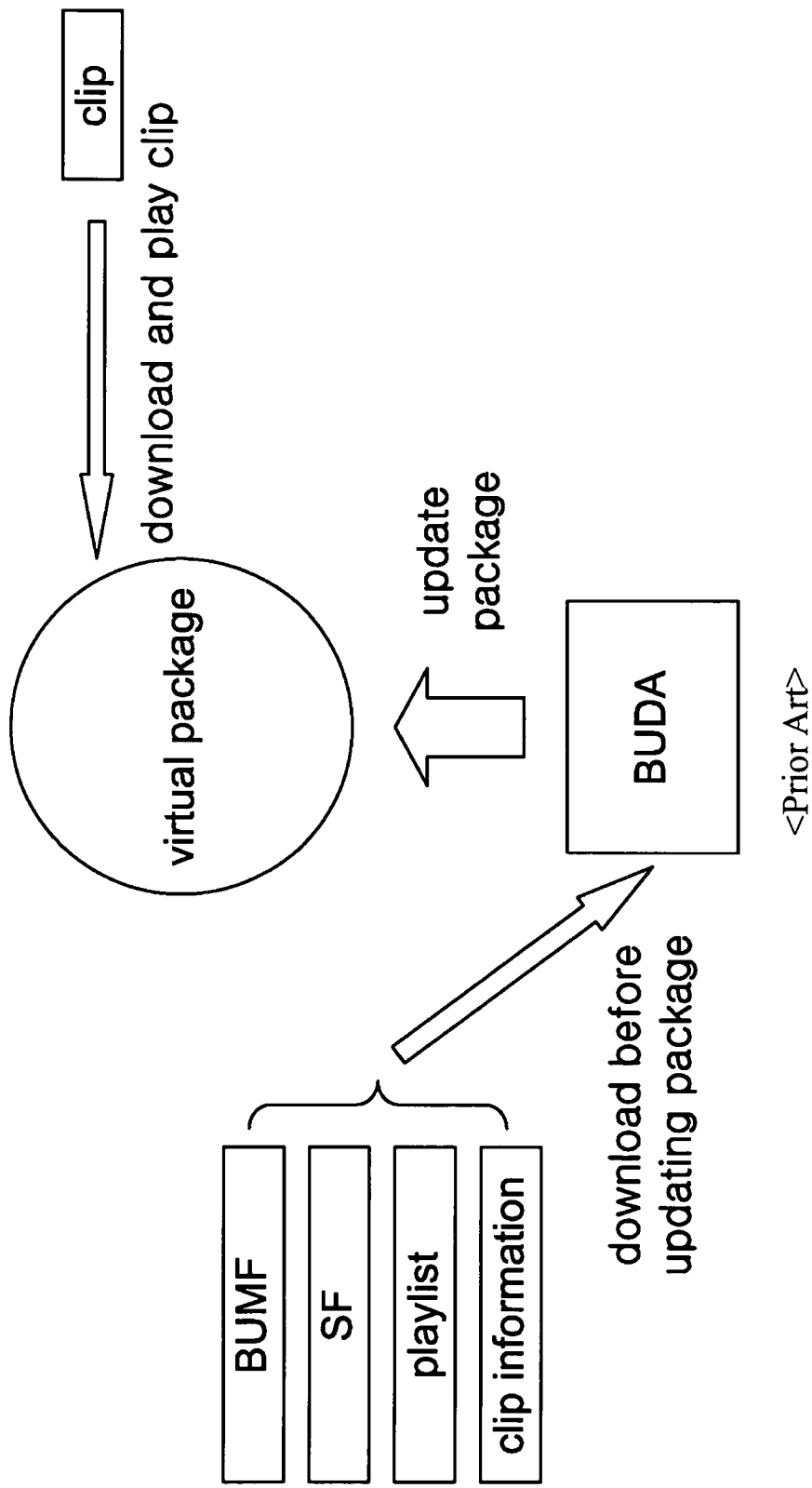
FIG. 1 is a diagram illustrating a configuration for receiving a digital content via a network in a conventional playback apparatus supporting a BD-J specification.
Figure 2:
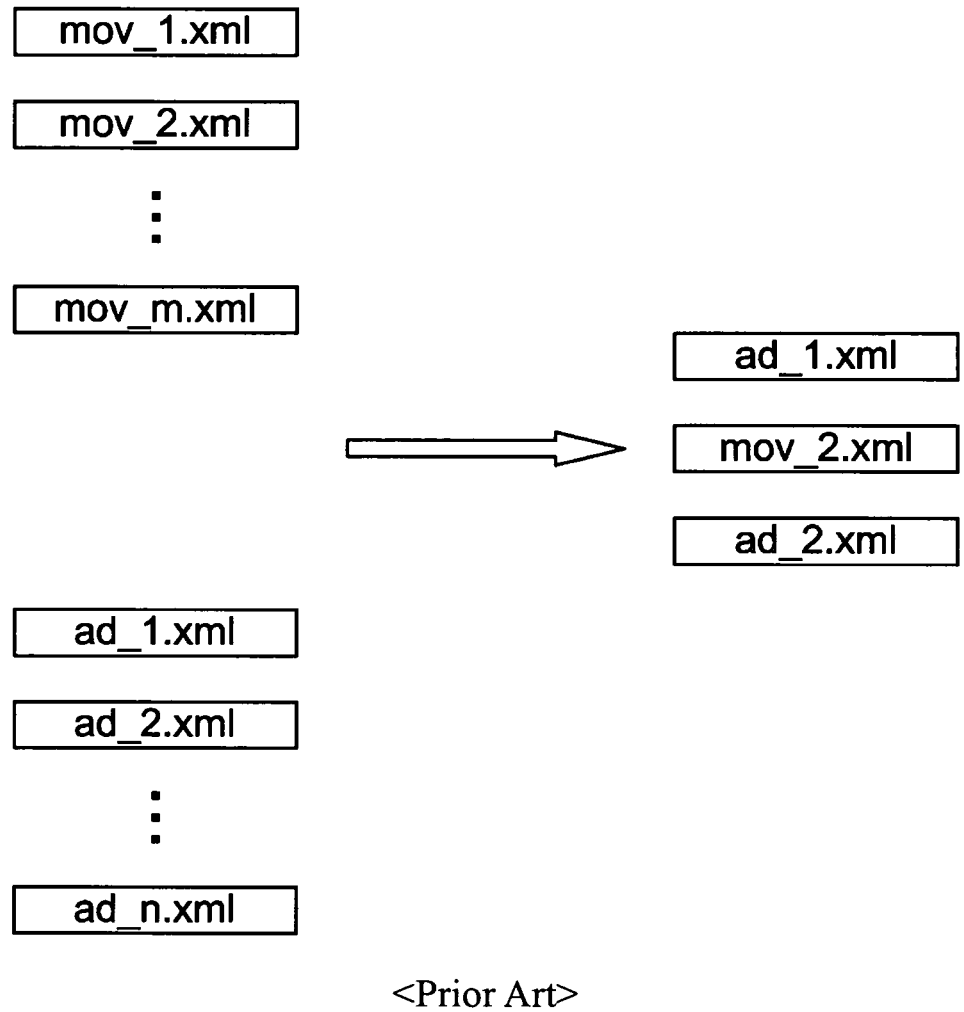
FIG. 2 is a diagram illustrating an example for configuring a virtual package according to a main digital content and an auxiliary digital content in a conventional playback apparatus supporting a BD-J specification.
Figure 3:
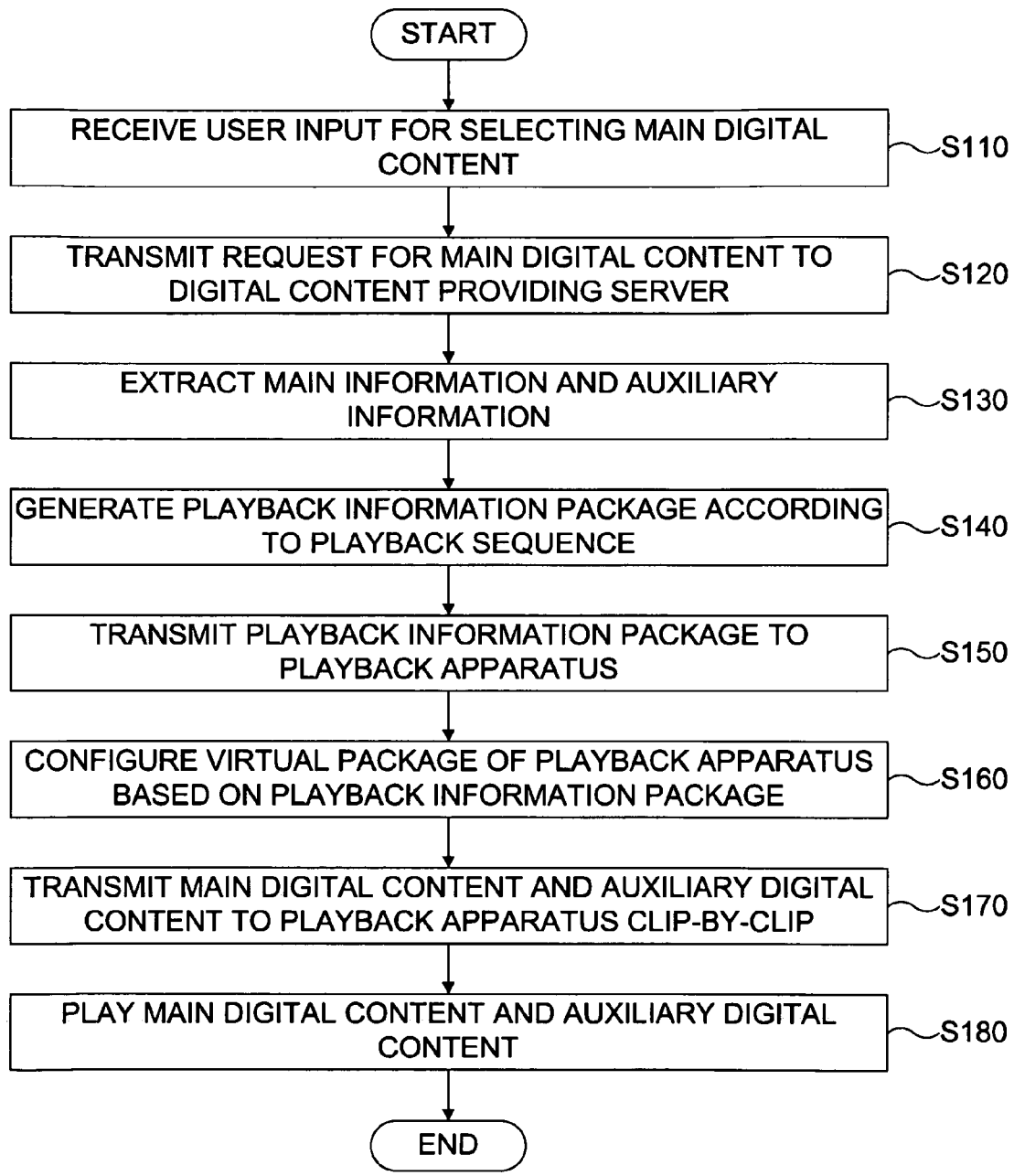
FIG. 3 is a flow diagram illustrating a method for providing a digital content in accordance with the present invention.

FIG. 3 is a flow diagram illustrating a method for providing a digital content in accordance with the present invention.

Referring to FIG. 3, a playback apparatus supporting a BD-J specification receives, from a user, a user input for selecting one of main digital contents (S110).

Specifically, the playback apparatus provides, to the user via a display device, informations related to the main digital contents that may provided by a digital content providing server. The user refers to the displayed informations related to the main digital contents to select one of the main digital contents. For instance, the playback apparatus may receive the user input corresponding to the selected main digital content through a remote controller operated by the user.

Thereafter, the playback apparatus generates a request for the selected main digital content according to the user input and transmits the request to the digital content providing server (S120).

For instance, when the digital content providing server provides movies via a VOD, the user may manipulate a keypad of the remote controller to select one of the movies to be viewed. The playback apparatus generates the request for a movie data corresponding to the selected movie, i.e. the selected main digital content, and transmits the request for the selected main digital content to the digital content providing server.

Preferably, when the user selects one of the main digital contents by operating the remote controller, the playback apparatus transmits the request which includes at least one of a content ID (Identification) information for identifying the selected main digital content, a device ID information for identifying the playback apparatus and a user ID information for identifying the user using the playback apparatus to the digital content providing server. The ID informations included in the request may be a criteria for selecting an auxiliary digital content stored in the digital content providing server.

Thereafter, a main information on the selected main digital content and an auxiliary information on the auxiliary digital content are extracted from the digital content providing server (S130).

Preferably, the digital content providing server may extract the auxiliary information based on the ID informations included in the request.

The main information is an information on a format of the main digital content. The playback apparatus plays the main digital content based on the main information. Preferably, the main information may include a BUMF (Binding Unit Manifest File) information, a SF (Signature File) information, a playlist information and a clip information of the main digital content.

The auxiliary information is an information on a format of the auxiliary digital content. The playback apparatus plays the auxiliary digital content based on the auxiliary information. Preferably, the auxiliary information may include a BUMF information, a SF information, a playlist information and a clip information of the auxiliary digital content.

Thereafter, a playback information package is generated by combining the main information and the auxiliary information extracted in the step S130 according to a playback sequence of the main digital content and the auxiliary digital content (S140).

Preferably, the digital content providing server dynamically generates the playback information package according to the playback sequence of the main digital content and the auxiliary digital content.

The playback information package may include a BUMF information, a SF information, a playlist information and a clip information, which are generated by combining the main information and the auxiliary information according to the playback sequence of the main digital content and the auxiliary digital content.

Figures 4, 5:
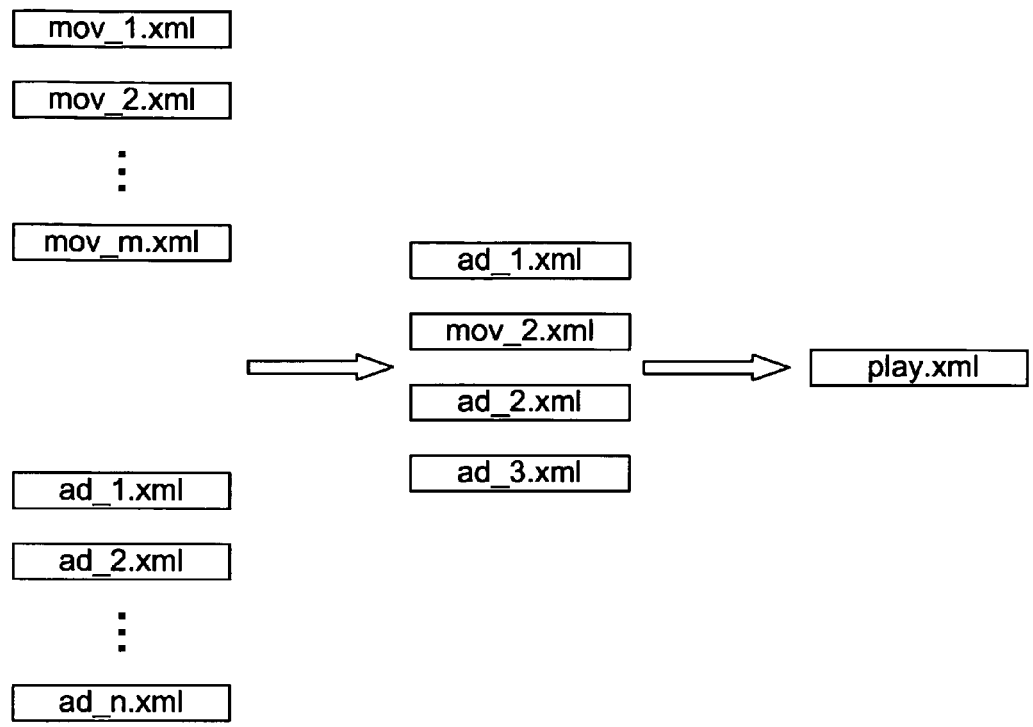
FIG. 4 is a diagram a configuration for generating a playback information package using a method for providing a digital content in accordance with the present invention.
FIG. 5 is a diagram illustrating an example a playback sequence of a main digital content and an auxiliary digital content according to a playback information package using a method for providing a digital content in accordance with the present invention.

For instance, as shown in FIG. 4, when the main informations mov_1.xml through mov_m.xml and the auxiliary information ad_1.xml through ad_n.xml are stored in the digital content providing server, the digital content providing server may extract the selected main information mov_2.xml on the main digital content corresponding to the request, and the auxiliary informations ad_1.xml, ad_2.xml and ad_3.xml on the auxiliary digital content based on the ID informations included in the request.

The digital content providing server generates the playback information package, namely play.xml, by combining mov_2.xml, ad_1.xml, ad_2.xml and ad_3.xml according to the playback sequence of the main digital content and the auxiliary digital content.

Thereafter, the digital content providing server transmits the playback information package to the playback apparatus (S150).

Thereafter, the playback apparatus configures a virtual package in order to play the main digital content and the auxiliary digital content based on the playback information package (S160).

Specifically, the playback apparatus extracts, from the playback information package received from the digital content providing server, the informations on the format each of the main digital content and the auxiliary digital content, and a virtual package is configured for the playback of the main digital content and the auxiliary digital content.

That is, the playback apparatus is required to configure the virtual package based on the playback information package only once to play the main digital content and the auxiliary digital content instead of configuring the virtual package for each of the main digital content and the auxiliary digital content. As a result, a delay due to configuring the virtual package for each of the main digital content and the auxiliary digital content may be prevented.

Thereafter, the digital content providing server transmits the main digital content and the auxiliary digital content stored therein to the playback apparatus clip-by-clip (S170).

Thereafter, the playback apparatus plays the main digital content and the auxiliary digital content (S180). Specifically, the playback apparatus may play the main digital content and the auxiliary digital content received from the digital content providing server clip-by-clip.

For instance, when the main digital content mov_2 containing clips m2c1 through m2c100 and the auxiliary digital contents ad_1, ad_2 and ad_3 containing clips a1c1 through a1c10, a2c1 through a2c10 and a3c1 through a3c10, respectively are to be played, the playback apparatus receives the main digital content and the auxiliary digital content according to the playback sequence included in the playback information package clip-by-clip. Ad_1 represents a pre-roll advertisement provided prior to the playback of mov_2, ad_2 represents a mid-roll advertisement provided during the playback of mov_2 and ad_3 represents a post-roll advertisement provided after the playback of mov_2.

As shown in FIG. 5, the playback apparatus sequentially receives and plays the clips a1c1 through a1c10 contained in ad_1, the clips m2c1 through m2c50 contained in mov_2, the clips a2c1 through a2c10 contained in ad_2, the clips m2c51 through m2c100 contained in mov_2, and the clips a3c1 through a3c10 contained in ad_3.

In accordance with the present invention, it is unnecessary to configure the virtual package required in a conventional playback apparatus for playing the mid-roll advertisement provided during the playback of the main digital content since the playback apparatus in accordance with the present invention configures the virtual package only once for playing the main digital content and the auxiliary digital content based on the playback information package.

Therefore, a single configuration of the virtual package of the playback apparatus enables the playback of the auxiliary digital content received from the digital content providing server.

A method for providing a digital content in accordance with another embodiment of the present invention is described in mores detail below.

Figure 6:
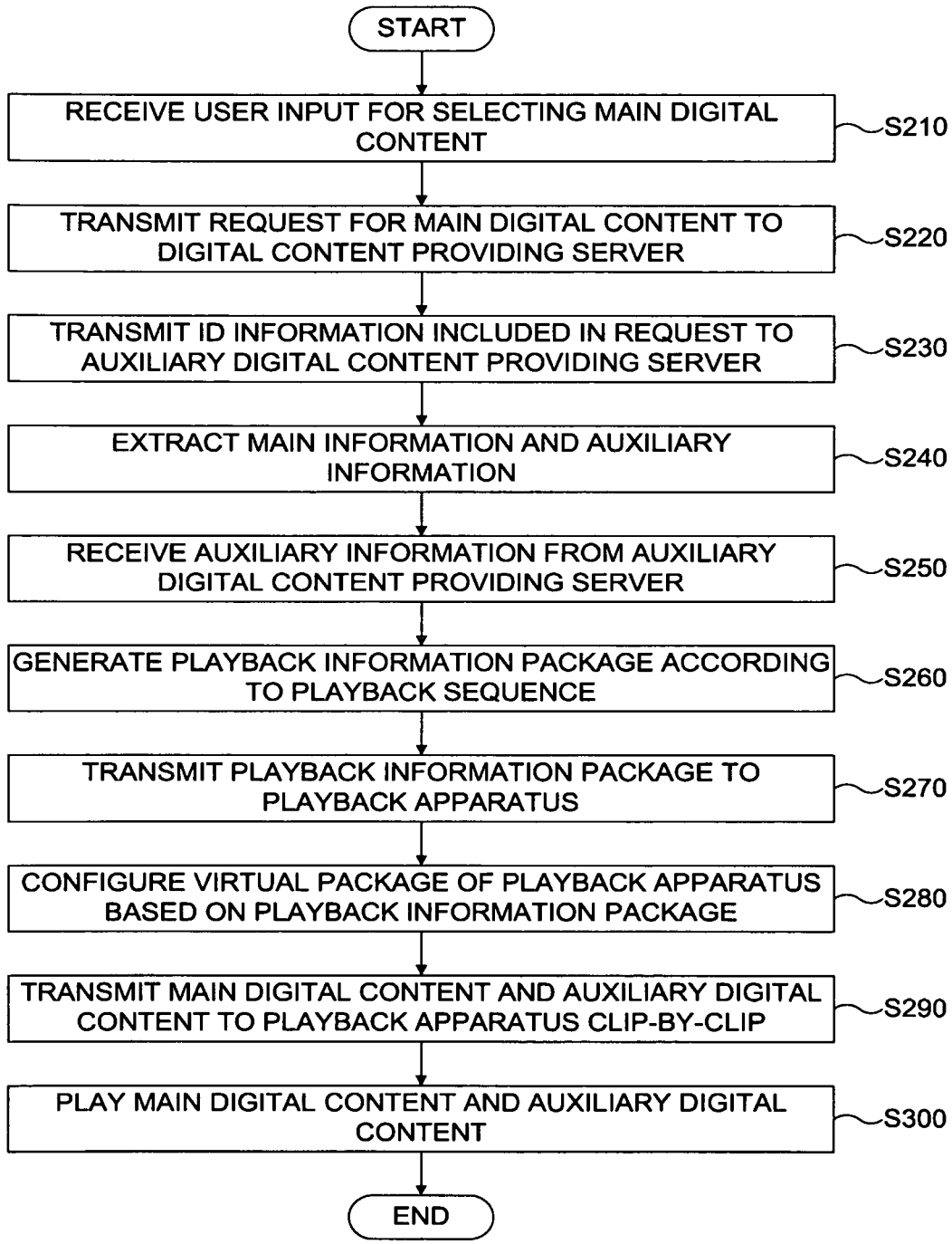
FIG. 6 is a flow diagram illustrating a method for providing a digital content in accordance with another embodiment of the present invention.

FIG. 6 is a flow diagram illustrating a method for providing a digital content in accordance with another embodiment of the present invention.

Referring to FIG. 6, a playback apparatus supporting a BD-J specification receives, from a user, a user input for selecting one of main digital contents (S210).

Specifically, the playback apparatus provides, to the user via a display device, informations related to the main digital contents that may provided by a digital content providing server. The user refers to the displayed informations related to the main digital contents to select one of the main digital contents. For instance, the playback apparatus may receive the user input corresponding to the selected main digital content through a remote controller operated by the user.

Thereafter, the playback apparatus generates a request for the selected main digital content according to the user input and transmits the request to the digital content providing server (S220).

For instance, when the digital content providing server provides movies via a VOD, the user may manipulate a keypad of the remote controller to select one of the movies to be viewed. The playback apparatus generates the request for a movie data corresponding to the selected movie, i.e. the selected main digital content, and transmits the request for the selected main digital content to the digital content providing server.

Preferably, when the user selects one of the main digital contents by operating the remote controller, the playback apparatus transmits the request which includes at least one of a content ID (Identification) information for identifying the selected main digital content, a device ID information for identifying the playback apparatus and a user ID information for identifying the user using the playback apparatus to the digital content providing server.

Thereafter, the digital content providing server transmits the ID informations included in the request to the auxiliary digital content providing server (S230).

Specifically, the ID informations included in the request may be a criteria for selecting an auxiliary digital content stored in the digital content providing server.

Thereafter, the main information on the selected main digital content and the auxiliary information on the auxiliary digital content are extracted from the digital content providing server and the auxiliary digital content providing server, respectively (S240).

Preferably, the auxiliary digital content providing server may extract the auxiliary information based on the ID informations included in the request received from the digital content providing server.

Since the main information and the auxiliary information are described above in detail with reference to FIG. 3, the detailed description thereof is omitted.

Thereafter, the auxiliary digital content providing server transmits the auxiliary information extracted in the step S240 to the digital content providing server (S250).

Thereafter, a playback information package is generated by combining the main information and the auxiliary information extracted in the step S240 according to a playback sequence of the main digital content and the auxiliary digital content (S260).

Preferably, the digital content providing server dynamically generates the playback information package according to the playback sequence of the main digital content and the auxiliary digital content.

The playback information package may include a BUMF information, a SF information, a playlist information and a clip information, which are generated by combining the main information and the auxiliary information according to the playback sequence of the main digital content and the auxiliary digital content. In addition, the playback information package may further comprise an ID information of the auxiliary digital content providing server, i.e. a position information on the each clips included in the auxiliary digital content.

Since the playback information package is described above in detail with reference to FIG. 4, the detailed description thereof is omitted.

Thereafter, the digital content providing server transmits the playback information package to the playback apparatus (S270).

Thereafter, the playback apparatus configures a virtual package in order to play the main digital content and the auxiliary digital content based on the playback information package (S280).

Specifically, the playback apparatus extracts, from the playback information package received from the digital content providing server, the informations on the format each of the main digital content and the auxiliary digital content, and a virtual package is configured for the playback of the main digital content and the auxiliary digital content.

That is, the playback apparatus is required to configure the virtual package based on the playback information package only once to play the main digital content and the auxiliary digital content instead of configuring the virtual package for each of the main digital content and the auxiliary digital content. As a result, a delay due to configuring the virtual package for each of the main digital content and the auxiliary digital content may be prevented.

Thereafter, the digital content providing server transmits the main digital content stored therein and the auxiliary digital content stored in the auxiliary digital content providing server to the playback apparatus clip-by-clip (S290).

Specifically, when the auxiliary digital content providing server transmits the auxiliary digital content stored therein to the digital content providing server, the digital content providing server may transmit the auxiliary digital content to the playback apparatus clip-by-clip.

Alternatively, the auxiliary digital content providing server may directly transmit the auxiliary digital content stored therein to the playback apparatus clip-by-clip.

Thereafter, the playback apparatus plays the main digital content and the auxiliary digital content (S300). Specifically, the playback apparatus may play the main digital content received from the digital content providing server and the auxiliary digital content received from the digital content providing server or the auxiliary digital content providing server clip-by-clip.

Preferably, the playback apparatus may play the auxiliary digital content received form the auxiliary digital content providing server based on the ID information on the auxiliary digital content providing server included in the playback information package.

The playback apparatus in accordance with the present invention provides following advantages by configuring the virtual package based on the playback information package.

Since it is not necessary to configure the virtual package for each of the main digital content and the auxiliary digital content, a time required for configuring the virtual package may be reduced. Therefore, an overall time required for providing the main digital content and the auxiliary digital content to the user may be reduced.

In addition, the virtual package is configured only once in order to play the main digital content and the auxiliary digital content regardless of the number of the main digital content and the auxiliary digital content, thereby facilitating the configuration of the playback apparatus.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for providing a digital content, the method being carried out by a digital content providing server and comprising steps of:
   (a) receiving at the digital content providing server a request for a main digital content sent from a playback apparatus, the playback apparatus supporting a Blue-Ray Disk Java (BD-J) specification;
   (b) extracting within the digital content providing server a main information on the main digital content to be provided to the playback apparatus according to the request and an auxiliary information on an auxiliary digital content to be provided to the playback apparatus along with the main digital content, the auxiliary digital content being stored in the digital content providing server or another server other than the playback apparatus;
   (c) combining within the digital content providing server the main information with the auxiliary information to generate a playback information package;
   (d) transmitting the playback information package from the digital content providing server to the playback apparatus; and
   (e) transmitting the main digital content and the auxiliary digital content from the digital content providing server to the playback apparatus according to the transmitted playback information package.

2. The method in accordance with claim 1, wherein the request includes at least one of
   a content ID information for identifying the main digital content,
   a device ID information for identifying the playback apparatus and
   a user ID information for identifying a user using the playback apparatus.

3. The method in accordance with claim 2, wherein the step (b) comprises:
   (b-1) extracting within the digital content providing server the main information on the main digital content;
   (b-2) transmitting at least one of the content ID information, the device ID information and the user ID information from the digital content providing server to an auxiliary digital content providing server storing the auxiliary digital content; and (b-3) receiving at the digital content providing server the auxiliary information from the auxiliary digital content providing server.

4. The method in accordance with claim 1, wherein the step (c) comprises combining the main information and the auxiliary information according to a playback sequence of the main digital content with the auxiliary digital content to generate the playback information package.

5. The method in accordance with claim 4, wherein the playback information package comprises
a Binding Unit Manifest File (BUMF) information,
a Signature File (SF) information and
a playlist information and a clip information generated by combining the main information and the auxiliary information according to the playback sequence of the main digital content and the auxiliary digital content.

6. The method in accordance with claim 1, further comprising transmitting the main digital content from the digital content providing server clip-by-clip to the playback apparatus.

7. The method in accordance with claim 1, further comprising:
receiving at the digital content providing server the auxiliary digital content from an auxiliary digital content providing server storing the auxiliary digital content; and
transmitting the auxiliary digital content clip-by-clip from the digital content providing server to the playback apparatus.

8. A method for providing a digital content, the method being carried out by a playback apparatus supporting a Blue-Ray Disk Java (BD-J) specification and comprising steps of:
(a) transmitting a request for a main digital content from the playback apparatus to a digital content providing server;
(b) receiving at the playback apparatus a playback information package from the digital content providing server dynamically generated by the digital content providing server, the playback information package being generated by the digital content providing server by combining a main information on the main digital content provided in response to the request with an auxiliary information on an auxiliary digital content, the auxiliary digital content being stored in the digital content providing server or another server other than the playback apparatus;
(c) configuring the playback apparatus for a playback of the main digital content and the auxiliary digital content based on the playback information package; and
(d) after step (c), receiving from the digital content providing server and playing the main digital content and the auxiliary digital content within the playback apparatus according to the received playback information.

9. The method in accordance with claim 8, further comprising receiving a user input for selecting the main digital content prior to carrying out in the step (a), wherein the step (a) comprises transmitting the request to the digital content providing server, wherein the request includes at least one of a content ID information for identifying the main digital content, a device ID information for identifying the playback apparatus and a user ID information for identifying a user using the playback apparatus.

10. The method in accordance with claim 9, wherein the step (b) comprises receiving the playback information package generated according to a playback sequence of the main digital content and the auxiliary digital content.

11. The method in accordance with claim 9, wherein the playback information package comprises a Binding Unit Manifest File (BUMF) information, a Signature File (SF) information and a playlist information and a clip information according to a playback sequence of the main digital content and the auxiliary digital content.

12. The method in accordance with claim 9, wherein the step (c) comprises configuring by the playback apparatus a virtual package for the playback of the main digital content and the auxiliary digital content based on the playback information package.

13. The method in accordance with claim 9, wherein the step (d) comprises receiving and playing each of the main digital content and the auxiliary digital content clip-by-clip from the digital content providing server.

14. The method in accordance with claim 9, wherein the playback information package further comprises an ID information for identifying an auxiliary digital content providing server, and wherein the step (d) comprises receiving and playing the auxiliary digital content clip-by-clip from the auxiliary digital content providing server.

\* \* \* \* \*